Nov. 11, 1941.　　　O. WITTEL　　　2,262,570
PHOTOGRAPHIC APPARATUS OF THE MAGAZINE TYPE
Filed Nov. 4, 1939　　　2 Sheets-Sheet 2
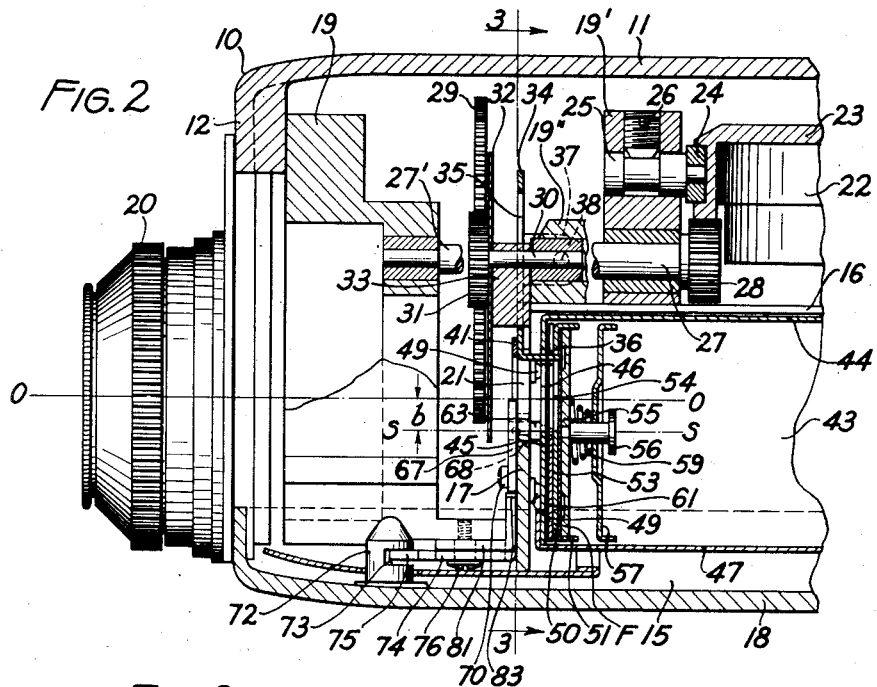
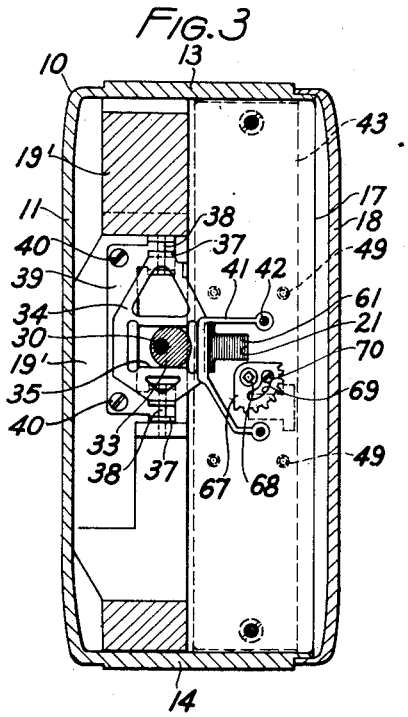
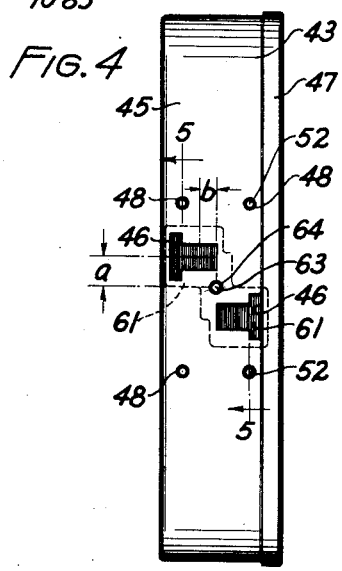
OTTO WITTEL
INVENTOR
BY
ATTORNEYS Patented Nov. 11, 1941

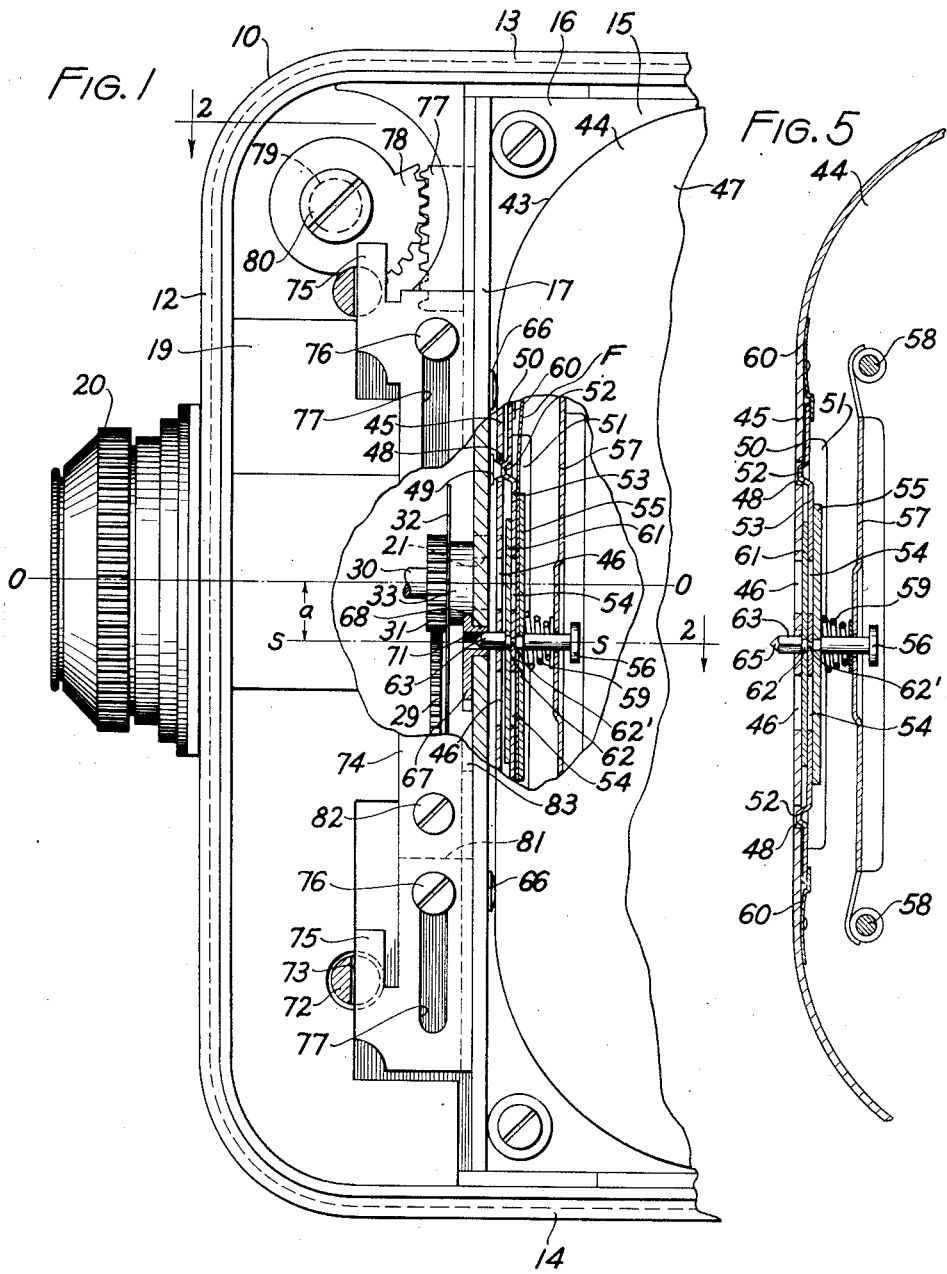

2,262,570

UNITED STATES PATENT OFFICE 2,262,570

PHOTOGRAPHIC APPARATUS OF THE MAGAZINE TYPE

Otto Wittel, Rochester, N. Y., assignor to Eastman Kodak Company, Rochester, N. Y., a corporation of New Jersey Application November 4, 1939, Serial No. 302,902

13 Claims. (Cl. 88—16)

This invention relates to a photographic apparatus of the magazine type and more particularly to a combination in which a detachable connection between the photographic apparatus and the film magazine serves to frame the exposure aperture in the magazine with respect to the objective member on the apparatus and also as an operative connection whereby the magazine shutter may be operated from the apparatus.

It is now known that the shutter of a film magazine may be operated from the apparatus by a detachable connection and also that the magazine shutter shaft may serve to locate the film magazine within the magazine chamber of the photographic apparatus. However, such magazine shutter operating mechanism and magazine locating arrangement have been separately provided.

The primary object of the present invention is the provision of a detachable connection between the apparatus and film magazine whereby the magazine shutter may be opened and closed from the apparatus and whereby the exposure aperture of the magazine is located or framed with respect to the optical system on the apparatus upon insertion of the film magazine into the magazine chamber of the apparatus.

Another object of the invention is the provision of the combination comprising a photographic apparatus provided with a magazine chamber and having an objective member or optical system with its axis passing through said magazine chamber and a film magazine having a shutter member rotatable about an axis which is parallel to but in predetermined spaced relation from the axis of said optical system.

A further object of the invention is the provision of a photographic apparatus for a reversible magazine having a shutter rotatable about an axis which coincides with the axis of inversion of the magazine with respect to the apparatus.

Still another object of the invention is the provision of a film magazine having a floating gate member resiliently urged toward an apertured wall of the magazine and having a shutter member between said wall and gate member and which is normally frictionally gripped therebetween.

A still further object of the invention is the provision of a film magazine having a shutter member gripped between the apertured wall of the magazine and a floating gate member in combination with an arrangement or projections on the apparatus which engage the floating gate member and relieve the pressure on the shutter member when the film magazine is inserted into the magazine chamber of the apparatus.

Other and further objects of the invention will be apparent to those skilled in the art from the following description.

The above and other objects of the invention are embodied in a photographic apparatus of the magazine type comprising the combination of a casing providing a magazine chamber, and an objective member for projecting an image into said magazine chamber, with a film magazine having a wall provided with an exposure aperture, a shutter member movable to closed and open positions with respect to said exposure aperture, and a detachable connection between said apparatus and said shutter member, for moving said shutter member to closed and open positions, and for locating said magazine within said chamber so that said exposure aperture properly frames the image from said objective member. In addition, the film magazine contains a floating gate member urged toward the apertured wall of the magazine and for frictionally engaging a shutter member therebetween. Projections on the apparatus engage the floating gate member to relieve the resilient pressure on the magazine shutter after the magazine has been inserted into the magazine chamber.

Reference is now made to the accompanying drawings wherein similar reference characters designate similar elements and wherein:

Fig. 1 is a partial side elevation of a magazine and camera including the combination of the invention and having a partial section taken at the film gate.

Fig. 2 is a partial horizontal section through a magazine and camera equipped with the combination of the invention and taken on the line 2—2 of Fig. 1.

Fig. 3 is a vertical section through the magazine camera taken on the line 3—3 of Fig. 2.

Fig. 4 is a front elevation of a film magazine having a shutter member embodying the features of the invention; and Fig. 5 is a fragmentary vertical section to enlarged scale through the film gate of the magazine and taken on the line 5—5 of Fig. 4.

Although the combination of the invention is described herein with respect to a magazine camera, it is to be understood that the invention may be used to equal advantage in other types of photographic apparatus of the magazine type. In the illustrated embodiment, the photographic apparatus comprises a camera casing 10 having a side wall 11, a front wall 12, a top wall 13, and a bottom wall 14. Said casing 10 provides a magazine chamber 15 having one side formed by the longitudinal mechanism plate 16 and its front wall formed by a front plate 17. The open side of magazine chamber 15 is enclosed by the camera cover 18 having edges inter-engaging with the edges of the casing 10.

A frame member 19 is mounted in the forward end of casing 10 and together with the front wall 12 supports an optical system or an objective member 20 so that the optical axis O—O thereof passes through said magazine chamber 15. Said front plate 17 is provided with a T-shaped opening 21, the elongated portion thereof receiving the film-advancing claw and the remaining rectangular portion thereof being in alignment with the objective member 20 or centered with respect to said optical axis O—O.

The film advancing and shutter means may be provided in conventional fashion or in the manner disclosed and now to be described. The spring motor 22 has a crown gear casing 23 provided with a peripheral groove engaged by a guide roller 24. Said guide roller 24 is rotatably mounted on the end of an eccentric stud 25 journaled in a portion 19' of the frame member 19 and held in an adjusted position by a set screw 26. A shaft 27 is journaled at one end in the portion 19' and has a reduced portion 27' journaled in the frame member 19. Said shaft 27 carries on one end a pinion 28 which meshes with the teeth of crown gear casing 23 and carries near its other end a large pinion gear 29.

A counter shaft 30 is also journaled in portion 19'' of the frame member 19, carries a pinion gear 31 meshing with the large pinion gear 29, carries a shutter blade 32 and also an eccentric cam 33.

The film-advancing means may comprise a shuttle member 34 provided with a central opening 35 for the eccentric cam 33 and having a claw tooth 36 which extends into and through the elongated portion of T-shaped opening 21. Said shuttle member 34 is mounted for vertical reciprocating motion and for rocking motion. To this end the shuttle member 34 has ears 37 engaging pins 38 vertically supported by a bracket 39 fastened to the portion 19' of frame member 19 by screws 40. A spring member 41 is attached to the front plate 17 by screws 42 and bears against the claw tooth 36, see Fig. 2, normally to urge said tooth 36 toward the magazine chamber 15. Said claw tooth 36 is provided with a beveled edge and is cammed out of the film perforations in a known manner upon upward movement of the shuttle member 34 by the eccentric cam 33.

The film magazine may comprise a casing 44 having a front lateral wall 45 provided with one or more exposure apertures 46. If the film magazine is of the reversible type, said front lateral wall 45 is preferably provided with a pair of T-shaped exposure apertures 46 which are laterally and longitudinally displaced with respect to each other. The magazine casing 44 is enclosed by a cover 47. Said front lateral wall 45 is also provided with a plurality of holes 48 arranged to register with and receive a plurality of projections 49 extending from the front plate 17.

The film gate in the magazine is of the floating type and comprises a film guiding member 50 having side flanges 51, having a plurality of protuberances 52 arranged to register with and enter the holes 48 in front wall 45, and has a displaced portion 53 which is provided with one or more openings 54 corresponding in outline to the openings in magazine front wall 45, said openings 54 being preferably T-shaped and longitudinally and laterally displaced in a reversible type of magazine. A pressure pad 55 fits between the side flanges 51 of film guiding member 50, carries a headed stud 56 which extends through an opening in a back member 57 which is supported at its ends by posts 58 on the casing 44 of the magazine. A spiral conical spring 59 encircles stud 56 between pressure pad 55 and back member 57 and urges the pressure pad 55 forwardly toward the displaced portion 53 of film guiding member 50 or to bear upon a film strip F therebetween. The film guiding surfaces of pressure pad 55 and of the displaced portion 53 of film guiding member 50 are embossed in a known manner so that the film strip F is supported only at its margins and the central or image areas thereof cannot be scratched. A pair of spring clips 60 are riveted to front lateral wall 45, see Fig. 5, and engage the ends of film guiding member 50 so that said film guiding member 50 is urged toward the front lateral wall 45.

A magazine shutter member is mounted between the front wall of the magazine and the floating gate member therein. Such a shutter member may comprise a shutter blade 61 formed so as to cover the exposure apertures 46 and the openings 54 in film guiding member 50. A shutter operating pin 62 has a reduced end 62' journaled in the displaced portion 53 of film guiding member 50 and has an enlarged square portion 63 extending through a hole 64 in front wall 45 and having a pointed end 65. The shutter blade 61 is securely fastened to shutter pin 62 so that upon rotation of said pin 62 the shutter blade 61 may be moved from the closed position shown in Figs. 1, 4 and 5 to the open position shown in Fig. 2 and in which the image projected by the objective member 20 is directed onto the film strip F in the magazine. In a reversible type of magazine, the exposure apertures, such as 46, are symmetrically arranged and according to the present invention the rotational axis of the shutter member coincides with the axis of symmetry and/or the axis of inversion of the magazine.

The thickness of the shutter blade 61 is greater than the depth of the displaced portion 53 of film guiding member 50. Consequently, when the magazine is not in the camera, the spring clips 60 press said displaced portion 53 of film guiding member 50 against the shutter blade 61 which is, therefore, squeezed or frictionally gripped between the front lateral wall 45 of the film magazine and the displaced portion 53 of the floating film guiding member 50. Such squeezing or frictional gripping tends to hold the shutter blade against movement or accidental rotation during transportation of the magazine or before it is placed in the camera. When the film magazine is inserted into the magazine chamber 15, said front lateral wall 45 abuts against the spacing studs 66 on front plate 17 and the projections 49 enter the holes 48 in lateral wall 45 to engage the protuberances 52 on film guiding member 50 and relieve the squeezing or pressure upon the shutter blade 61. As a result, the shutter blade 61 may be more easily moved or rotated after the film magazine is placed in the camera, while the shutter blade is tightly gripped to prevent movement thereof or dust or light leakage therearound when the magazine is outside of the camera or magazine chamber 15. The spring clips 60 in addition to exerting pressure on film guiding member 50 toward the wall 45 may also be formed so as to support said guiding member 50 with the openings 54 therein in registry with the exposure apertures 46 in front lateral wall 45.

The essence of the invention is the provision of a detachable connection between the film magazine and the apparatus whereby the shutter member may be operated from the apparatus and whereby the exposure apertures or openings in the film magazine are properly framed with respect to the optical system or optical axis of the objective member. Such a detachable connection includes a part movably mounted on the frame member and adapted to co-operate with the shutter member of the film magazine when the same is inserted into the magazine chamber. The movable or rotatable part may comprise a geared sector 67 having a bushing 68 journaled in front plate 17 and provided with an arcuate slot 69. A screw 70 passes through said arcuate slot 69 and holds the gear sector 67 against one face of front plate 17. Said gear sector 67 may be operated in any suitable manner and is preferably rotated by a rack connected to the cover latch. The shutter operator or geared sector 67 is formed to co-operate with the shutter member. Specifically, the bushing 68 may be provided with a square opening 71 for receiving the square portion 63 of the shutter operating pin 62.

The camera cover 18 carries a pair of pins 72 which are provided with lateral slots 73. The latching bar 74 has projections 75 for engaging the lateral slot of pin 72 and is slidably mounted by means of headed screws 76 passing through elongated slots 77 of latching bar 74 and being threaded into the frame member 19. Said latching bar 74 has a rack portion 77 meshing with a gear sector 78 which is mounted in the end of the spindle 79 by a screw 80. An angle member 81 is attached to latching bar 74 as by a screw 82 and has a rack portion 83 meshing with the toothed periphery of gear sector 67. Consequently, upon rotation of the spindle 79 by the turning of a knob, not shown, external to the casing 10, the latching bar 74 is raised and rack portion 83 rotates gear sector 67 so that the shutter member and shutter blade 61 are moved from the closed position shown in Fig. 1 to the open position shown in Fig. 2.

The axis of rotation of the shutter operator within the apparatus or on front plate 17 of the frame member is parallel to the optical axis of the optical system or objective member 20 passing through the magazine chamber 15. In addition, said axis of rotation of the shutter operator is located a predetermined distance from the axis O—O of the objective member 20. The axis of rotation S—S is vertically spaced the distance $a$, see Fig. 1, from the optical axis O—O and said axis S—S, see Fig. 2, is laterally spaced the distance $b$ from the optical axis O—O. Similarly, the axis of rotation of the shutter member is vertically spaced from the center of the image portion of the exposure aperture 46 the distance $a$ and is laterally spaced the distance $b$ from the center of the image aperture at 46. Consequently, when the film magazine is inserted into the camera and shutter operating pin 62 enters the square opening 71 in the shutter operator on the frame, the image portion of exposure aperture 46 is centered or properly framed with respect to the optical axis of the objective member 20.

According to the invention herein above disclosed, the detachable connection between the photographic apparatus and the film magazine therein serves a dual function. First, during insertion of the magazine, the shutter operating pin 62 is guided so that the exposure aperture 46 properly frames the image projected onto the magazine chamber 15 by the objective member 20 and after insertion of the magazine the same detachable connection serves as the operative connection from a shutter operator on the apparatus to the shutter member in the film magazine. Also the floating gate member, which presses the shutter member against the front wall of the magazine before insertion, is relieved after insertion of the magazine into the chamber and engagement of projections 49 with protuberances 52 and the shutter member may be more freely moved or rotated.

Since various modifications of the invention are possible without departing from the spirit thereof, the present disclosure is to be construed in an illustrative sense and the scope of the invention is defined by the following claims.

Having now particularly described my invention what I desire to secure by Letters Patent of the United States and what I claim is:

1. In a photographic apparatus of the magazine type, the combination with a casing providing a magazine chamber which is adapted to receive a film magazine having a movable shutter member, and an objective member having an optical axis extending through said magazine chamber, of a locating and operating member mounted on said casing for rotation about an axis which is in fixed parallel spaced relation to said optical axis, and for engaging the shutter member of a film magazine in said magazine chamber to locate the film magazine therein and also to move said shutter member for opening and closing the same.

2. In a photographic apparatus of the magazine type, the combination with a casing providing a magazine chamber, a frame member in said casing, and an objective member having an optical axis extending through said magazine chamber, of a film magazine having a wall provided with an exposure aperture, a shutter member on said magazine and rotatable about an axis to open and close said exposure aperture, and a detachable connection including a part mounted on said frame member for rotation about an axis in fixed parallel spaced relation to said optical axis and adapted to cooperate with said shutter member when the magazine is inserted into said chamber so that said shutter member may be opened and closed by rotation of said part and so that the exposure aperture in said magazine is located to frame the image projected by said objective member.

3. In a photographic apparatus of the magazine type, the combination with a casing providing a magazine chamber which is adapted to receive a film magazine having a movable shutter member, and an objective member having an optical axis extending through said magazine chamber, of a locating and operating member mounted on said casing for rotation about an axis which is in fixed parallel spaced relation to said optical axis, and for engaging the shutter member of a film magazine in said magazine chamber to locate the film magazine therein and also to move said shutter member for opening and closing the same, and means on said casing for moving said locating and operating member.

4. In a photographic apparatus of the magazine type, the combination with a casing providing a magazine chamber, a frame member in said casing, and an objective member on said casing and having an optical axis extending through said magazine chamber, of a film magazine having a wall provided with an exposure aperture, a shutter member on said magazine including a projection extending from said magazine and operable to move said shutter member to closed and open positions with respect to said exposure aperture, and a part mounted on said frame member for rotation about an axis in parallel spaced relation to said optical axis and provided with an opening for receiving the projection of the magazine shutter member both to frame the exposure aperture with respect to the axis of said objective upon insertion of the magazine and operatively to engage said projection for movement of said shutter member to open and closed positions.

5. In a photographic apparatus of the magazine type, the combination with a film magazine having a wall provided with an exposure aperture, a film guiding member movable within said magazine toward and away from said wall and also provided with an aperture, a shutter member movably mounted between said wall and said film guiding member and for covering and uncovering said aperture, and a resilient means engaging said film guiding member and normally urging the same toward said wall frictionally to grip said shutter member therebetween, of a casing providing a magazine chamber and including a frame member forming one wall of said chamber and having a portion for engaging said film guiding member and for moving the same away from said wall against the action of said resilient means to relieve the frictional gripping of said shutter member between said wall and the film guiding member when said magazine is inserted into said chamber.

6. In a photographic apparatus of the magazine type, the combination with a film magazine having a wall provided with an exposure aperture and with a plurality of holes, a film guiding member provided with an exposure aperture and having a plurality of protuberances arranged opposite said holes, a shutter member movably mounted between said wall and said film guiding member, and a resilient means normally urging said film guiding member toward said wall for frictional gripping of said shutter member therebetween and pressing said protuberances into said holes, of a casing providing a magazine chamber and including a frame member having a plurality of projections arranged to enter said holes and engage said protuberances and for moving said film guiding member away from said wall to relieve the frictional gripping of said shutter member therebetween when said magazine is inserted into said chamber.

7. In a photographic apparatus of the reversible type, the combination with a casing providing a magazine chamber and including a frame member, an optical system on said casing and for projecting an image along the optical axis thereof and into said magazine chamber, a film magazine having an apertured wall and adapted to be positioned in said chamber in either of two relatively inverted positions with respect to an axis of inversion passing through said magazine chamber, and a shutter member on said magazine and rotatable to closed and open positions, of a shutter operator on said frame member and rotatable about an axis coinciding with the axis of inversion of said magazine and in parallel predetermined spaced relation to said optical axis in the magazine chamber, arranged to cooperate with said shutter member in either position of said magazine in said chamber, for locating said magazine to frame the image projected from said objective member, and also for operating said shutter member to open and close the same.

8. In a photographic apparatus of the reversible magazine type, the combination with a casing providing a magazine chamber adapted to receive a film magazine which may be placed in said chamber in either of two relatively inverted positions with respect to an axis of inversion passing through said magazine chamber and which has a movable shutter member, and an optical system on said casing and for projecting an image along the optical axis thereof and into said magazine chamber, of a shutter operator on said casing and rotatable about an axis coinciding with the axis of magazine inversion and in parallel spaced relation to said optical axis, and for cooperating with a shutter member in either position of a film magazine in said chamber to locate the magazine to frame the image from said optical system and to move said shutter member for opening and closing the same.

9. In a film magazine, the combination with a casing having a wall provided with an exposure aperture, a film guiding member movable within said casing toward and away from said wall and also provided with an aperture, and a shutter member movably mounted between said wall and said film guiding member and for covering and uncovering said aperture, of a resilient means engaging said film guiding member and normally urging the same toward said wall so that said shutter member is frictionally gripped between said wall and said film guiding member.

10. In a film magazine, the combination with a casing having a wall provided with an exposure aperture, a film guiding member movable within said casing toward and away from said wall and having a displaced portion provided with an aperture, and a shutter member movably mounted within said displaced portion and for covering and uncovering said aperture, said shutter member being thicker than the depth of said displaced portion of the film guiding member, of a resilient means engaging said film guiding member and normally urging the same toward said wall so that said shutter member is frictionally gripped between said wall and the displaced portion of said film guiding member.

11. In a reversible film magazine, the combination with a casing having a wall which is symmetrically apertured with respect to an axis of symmetry perpendicular to said wall, a film guiding member movable within said casing toward and away from said wall and also symmetrically apertured, and a shutter member between said wall and said film guiding member, rotatable about an axis coinciding with said axis of symmetry, and for covering and uncovering the apertured portion of said wall and said film guiding member, of a resilient means in said casing engaging said film guiding member, normally urging the same along said axes toward said wall, and squeezing said shutter member between said film guiding member and the apertured wall of said casing.

12. In a reversible film magazine, the combination with a casing having a wall which is symmetrically apertured with respect to an axis of symmetry perpendicular to said wall, a film guiding member movable within said casing toward and away from said wall and also symmetrically apertured, and a shutter member between said wall and said film guiding member for covering and uncovering the apertured portion of said wall and said film guiding member and including a pin journaled at one end in said film guiding member and extending through said wall for rotation about an axis coinciding with said axis of symmetry, of a resilient means in said casing engaging said film guiding member, normally urging the same along said axes toward said wall, and squeezing said shutter member between said film guiding member and the apertured wall of said casing.

13. A photographic apparatus of the magazine type, comprising a casing providing a magazine chamber which is adapted to receive a film magazine having a shutter member, a frame member in said casing, an optical system on said casing and for projecting an image along the optical axis of said system into said magazine chamber, and a shutter operator mounted on said frame for rotation about an axis in parallel and predetermined spaced relation to said optical axis in the magazine chamber, arranged to co-operate with the shutter member of a film magazine inserted into said chamber, for locating said magazine to center the exposure opening therein with respect to said optical axis, and also for rotating said shutter member to open and close the same.

OTTO WITTEL.

Disclaimer 2,262,570.—*Otto Wittel*, Rochester, N. Y. Photographic Apparatus of the Magazine Type. Patent dated Nov. 11, 1941. Disclaimer filed Feb. 24, 1949, by the assignee, *Eastman Kodak Company*.

Hereby enters this disclaimer to claims 1 to 8, inclusive, and to claim 13 of said patent.

[*Official Gazette March 29, 1949.*]